Feb. 6, 1940.    M. J. FIELDS ET AL    2,189,359
MUSIC NOTE PITCH TEACHING DEVICE
Filed Aug. 9, 1938    2 Sheets-Sheet 1

Inventors
Milo J. Fields
C. Zuercher
By Watson E. Coleman
Attorney

Feb. 6, 1940.　　M. J. FIELDS ET AL　　2,189,359
MUSIC NOTE PITCH TEACHING DEVICE
Filed Aug. 9, 1938　　2 Sheets-Sheet 2
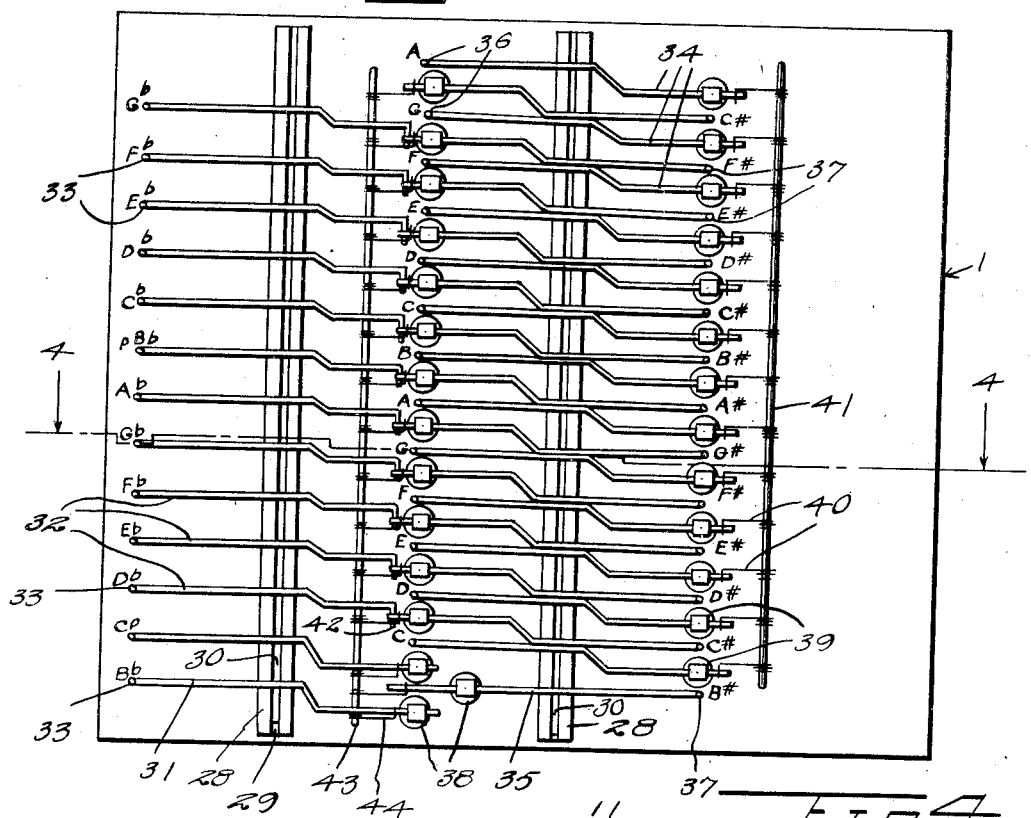
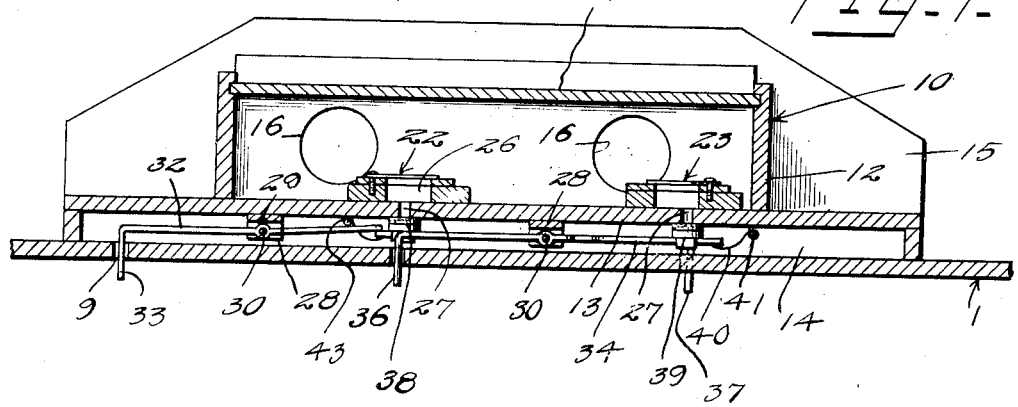
Inventors
Milo J Fields
C. Zuercher
By Watson E. Coleman
Attorney Patented Feb. 6, 1940

2,189,359

UNITED STATES PATENT OFFICE 2,189,359

MUSIC NOTE PITCH TEACHING DEVICE

Milo J. Fields, Bluffton, and Chris Zuercher, Berne, Ind.

Application August 9, 1938, Serial No. 223,980

5 Claims. (Cl. 84—456)

This invention relates to the class of music and pertains particularly to improvements in devices for facilitating giving musical instruction. In the teaching of music, particularly in giving instruction in singing, it is difficult for a pupil to read music and make a voice sound of exactly the right pitch corresponding to each of the notes which he reads. While it is, of course, possible to point out a particular note on a scale and sound that note on an instrument board, such as the keyboard of a piano, this still does not help to a great extent in associating the pitch of the note with the location of the note upon the music staf.

The present invention has for its primary object to provide a device which may be set up in front of a pupil and which by means of buttons or levers located upon each of the notes of a music staf, can be employed for teaching a pupil the correct tone pitch for each note of the scale whether the same be sounded as a natural or as a sharp or a flat, thus enabling the pupil to correlate by means of the eye and the ear, any note and the tone pitch associated therewith.

Another object of the invention is to provide a device of the above described character which is of relatively simple construction and which may be operated by a pupil as well as by the teacher so that the pupil will not only obtain visual and oral association between the sounds and the notes but will have these impressions made more positive and lasting through the act of placing his fingers upon the notes sounded while those notes are located in their proper positions upon the music staf.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 3 is a view of the front side of the keyboard.

Fig. 4 is a sectional view taken substantially on the line 4—4 of Fig. 3.

Figure 1:
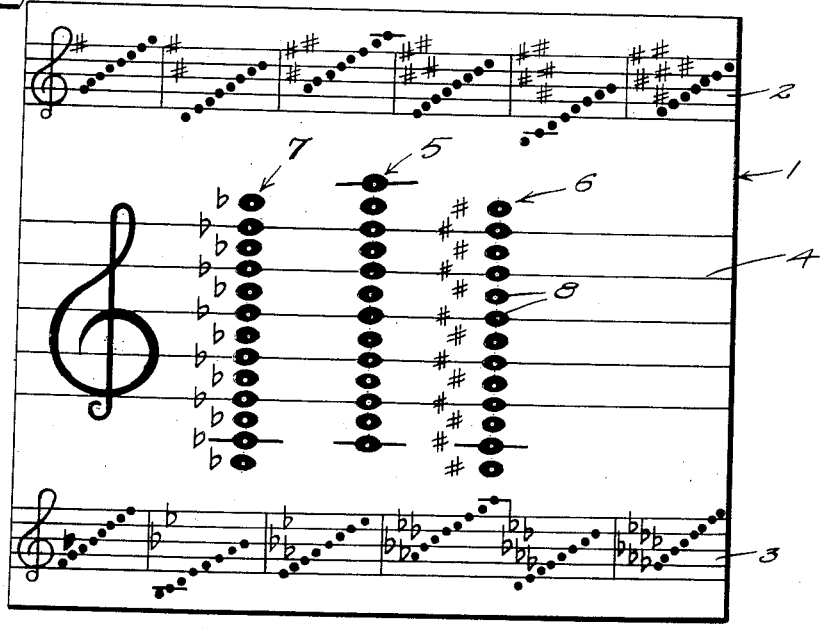
Fig. 1 is a view in front elevation of the device embodying the present invention showing the natural note positions upon a staf with the notes represented in sharps and flats, and the sound producing buttons or levers associated with these notes.
Figure 2:
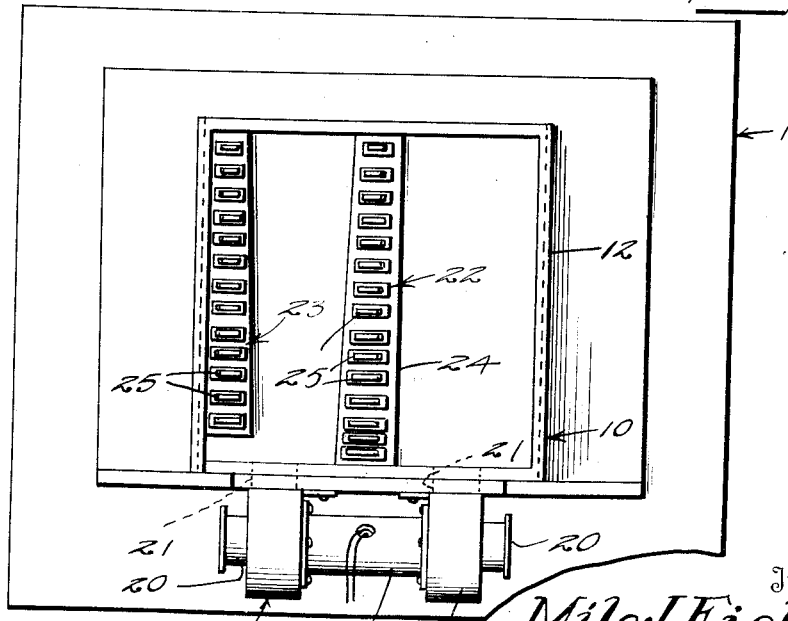
Fig. 2 is a view of the rear side of the device as shown in Fig. 1, with a wall removed to show the tone reeds.

Referring now more particularly to the drawings, the numeral 1 generally designates the front board or panel of the teaching device, the face of which is provided with the upper and lower teaching scales 2 and 3 where different scales are shown on the staf, having from one to six sharps, referring to the upper scale 2, and from one to six flats as shown in the lower scale 3. Between the teaching scales is what might be termed the tone scale which is indicated by the numeral 4 and in which notes are arranged in the three vertical groups 5, 6 and 7, the notes of group 5 being naturals, those of group 6 being sharps and those of group 7 being flats. Each of the notes of the three groups is represented by the conventional elliptical outline 8 and in the center of each note outline the board is provided with an aperture 9.

At the back of the board 1 is an air box indicated generally by the numeral 10 which has a removable back wall 11, the side walls 12 and a front wall 13 which is mounted in spaced relation with the back of the panel or board 1 forming the valve chamber 14. Extending from the lower part of the panel 1 is a horizontal board or shelf 15 which forms a bottom for the air box 10 and which is provided with the openings 16 which lead into the air box.

Secured to the underside of the board 15 is a blower unit which is indicated generally by the numeral 17 and is here shown as consisting of a motor 18 having at each side a blower 19, the inlet of which is indicated at 20 while the outlet is directed upwardly as indicated at 21 through an opening 16 to discharge air into the air box 10. This blower and motor unit is of a standard type readily obtainable in the market and in itself forms no part of the present invention and, therefore, is not required to be illustrated or described in detail.

Within the air box 10 there are positioned the two vertical rows of reeds 22 and 23, the reeds of each row being mounted upon a suitable panel or strip 24 and each reed is indicated by the numeral 25 and overlies an opening or air passage 26 formed through the panel or strip 24 upon which it is mounted and the air passages 26 of the strips 24 coincide with air passages 27 formed through the wall 13 upon which the reed supporting strips 24 are mounted, as shown in Fig. 4. The reeds of group 22 are tuned to sound the natural tones of the notes while the reeds of group 23 are tuned to sound the sharps or flats, and it will be seen from Fig. 4 that the front board or wall 13 of the air box is provided with two rows of the air holes 27 corresponding with the two groups of reeds 22 and 23.

The front side of the board or wall 13 is provided with the two vertical bars 28, each of which is provided with a longitudinal groove 29 in which is secured an axle bar or rod 30. On the axle rod 30 of one of the bars 28 there are oscillatably mounted levers 31 and 32. Each of these levers 31 and 32 has at one end a laterally turned or extended push pin 33 and these pins are all disposed in a vertical line to extend through adjacent apertures 9 of the panel 1 and through the notes of the series 7 which are represented on the front of the panel as flats.

The other bar 28 has mounted upon the axle rod 30 which it supports, a series of levers, each of which is indicated by the numeral 34 and a second series of levers, each of which is indicated by the numeral 35. The levers of the series 34 have laterally turned push pin ends 36, all of which extend forwardly through the series of natural notes 5 in the vertical center of the panel while the levers 35 are provided with the laterally turned push pin forming ends 37 which are arranged in a vertical series and extend through the apertures of the series of sharps 6. The vertical series of apertures 27 which are associated with the series of reeds 22 are covered by pads 38 and the vertical series of apertures 27 which are associated with the series of reeds 23 are covered by pads 39. The levers 34 are each connected with a pad 39 and these levers control the sounding of the natural notes. These pads are normally maintained in position to close the adjacent holes 27 by springs 40 which are supported upon a common support bar 41.

The levers 35 are each connected with one of the pads 38 and each of these levers controls the sounding of a sharp.

The levers 31 are also each connected with a pad 38 for the sounding of a flat while the other adjacent levers 32 have their inner ends turned to form the angular fingers 42 for engagement under the adjacent ends of certain of the levers 35 so that by the manipulation either of a lever 32 or of a lever 35, the same tone will be reproduced which may be either a flat or a sharp.

A spring supporting bar 43 is provided carrying springs 44 which engage levers 31 and 35 to maintain the pads 38 with which these levers are connected in closed relation with the adjacent air holes 27 which are associated with the central series of reeds 22.

In the use of the present device, the air box 10 is filled with air by means of the pumps 19 and this air will be retained because of the fact that all of the pads 38 and 39 are in closed position with respect to the air passages 27. As a pupil is being taught with the scales on the stafs 2 and 3, it may become necessary for him to be given the proper pitch of a particular note. When this is necessary, then the pupil, knowing the note which he wishes to get the pitch of, will press a push pin in the proper note of the proper series appearing on the staf 4 and air from the box 10 will escape through the associate reed and sound the proper pitch. For example, if the pupil is going over a scale on the lower staf 3 and is unable to get the pitch of the note A natural in the second space of the staf, then he will press or force inwardly the push pin 36 which extends through this note in the staf 4 and the proper pitch for this note will be sounded. The same procedure will be employed for obtaining the sharps or flats of the various notes.

From the foregoing, it will be readily apparent that the device herein described is of relatively simple construction but may be employed for effectively teaching the association of sight and sound in reading music and that after studying this chart seriously, a pupil should be able, in a short time, to place his tones correctly and have a lasting impression of the different scales.

In addition to the playing of consecutive notes upon the present device whereby the tones of the individual notes may be readily ascertained in association with a mental picture of the location of the note on the staf, a pupil will be able to play the major and minor and seventh chords and thus obtain a mental impression of the tone produced by a combination of notes together with a mental picture of the location of the notes on the staf by which the tones are produced.

What is claimed is:

1. In a device of the character described, a music staf having notes arranged thereon in three series representing naturals, flats and sharps, and means associated with each note of each series which is so constructed and arranged that the pitch of each note may be sounded.

2. A device of the character described, comprising a panel having a music staf thereon, notes indicated on the staf and arranged in three series representing naturals, flats and sharps, a shiftable element extending through each note of each series and through said panel to the rear thereof, means for sounding the pitch of each note represented in each of said series, and means controlled by each shiftable element whereby upon being shifted in one direction the proper tone pitch will be sounded by said sounding means for the note through which the shiftable element extends.

3. A music note pitch teaching device, comprising a panel having a music staf upon the face thereof, notes upon said staf arranged in three series representing naturals, flats and sharps, the panel having a series of apertures associated with each series of notes and each aperture passing through a note, means forming an air chamber at the rear of said panel which is constructed to retain air under pressure, a pitch sounding reed in the air chamber for each of the notes of said natural series and a pitch sounding reed in the air chamber for the notes of the flat and sharp series, said reeds covering air escape openings leading out of the chamber, pads covering said air escape openings, and means for actuating said pads, each of said pad actuating means having a finger connected therewith and extending through an aperture passing through a note.

4. A device of the character described, comprising a chart having upon one face a plurality of teaching scales, a staf on the said face of the chart having three groups of notes thereon, one of said groups representing natural notes, a second group representing sharps and a third group representing flats, an air operated reed associated with each of the notes on said staf, an air passageway covered by each of said reeds whereby the reeds will be vibrated on movement of air through the passageways, a pad normally covering said air passageways, a key associated with each note of each of said groups and connected with a pad, each of said keys being operable from the face of the chart adjacent the note with which it is associated to raise a pad to permit movement of air through the adjacent passageway and the vibration of the adjacent reed to sound the associate note.

5. A device of the character described, comprising a board having a music staf on one face and music notes arranged in three series on the staf, one series representing natural notes, a second series representing flats and the third series representing sharps, said board having an aperture therethrough adjacent each note of each series, means forming a chamber immediately behind the board into which said apertures open, means forming an air box behind said chamber and adapted to contain air under pressure, there being two series of air passageways from said air box into said chamber, one of said series of passageways corresponding in number with the natural notes, the other series of passageways corresponding in number with the sharps and flats, a reed covering each of said passageways of each series upon the air box side of the passageway, pads covering said air passageways and disposed within said chamber, a series of levers corresponding in number with and associated with each series of notes, an actuating element carried by each lever and extending through a note aperture and exposed at the front of said board, and connecting means between each lever and an air passageway covering pad whereby the oscillation of any lever associated with a note will effect the movement of the pad to permit air to pass through the passageway to sound the reed and give the pitch of that note.

MILO J. FIELDS.
CHRIS ZUERCHER.